(12) United States Patent
Miller et al.

(10) Patent No.: US 9,725,155 B2
(45) Date of Patent: Aug. 8, 2017

(54) METHOD AND SYSTEM FOR OPEN ROTOR ENGINE FUSELAGE PROTECTION

(71) Applicant: General Electric Company, Schenectady, NY (US)

(72) Inventors: Brandon Wayne Miller, Middletown, OH (US); Ian Francis Prentice, Cincinatti, OH (US); Trevor Wayne Goerig, Cincinnati, OH (US); Trevor Howard Wood, Clifton Park, NY (US); Kishore Ramakrishnan, Rexford, NY (US); Andrew Breeze-Stringfellow, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 122 days.

(21) Appl. No.: 14/984,758

(22) Filed: Dec. 30, 2015

(65) Prior Publication Data
US 2017/0190409 A1    Jul. 6, 2017

(51) Int. Cl.
*B64C 1/40* (2006.01)
*B64D 27/12* (2006.01)
(Continued)

(52) U.S. Cl.
CPC ............... *B64C 1/40* (2013.01); *B64D 27/12* (2013.01); *B64C 11/00* (2013.01); *B64D 2027/005* (2013.01)

(58) Field of Classification Search
CPC . B64C 1/40; B64C 11/00; B64D 29/04; F02C 7/045
See application file for complete search history.

(56) References Cited

U.S. PATENT DOCUMENTS 2,581,625 A * 1/1952 Brady .................... B64C 11/00
                                                        244/119
2,927,749 A    3/1960 Brownell
(Continued)

FOREIGN PATENT DOCUMENTS

CA    2269424 A1    4/1998
EP    2 517 955 A2  10/2012
(Continued)

OTHER PUBLICATIONS

Extended European Search Report and Opinion issued in connection with corresponding EP Application No. 16203392.2 dated Mar. 16, 2017.

*Primary Examiner* — Brian M O'Hara
(74) *Attorney, Agent, or Firm* — Pamela A. Kachur (57) ABSTRACT

An aircraft and method of operating the aircraft are provided. The aircraft includes a fuselage including a nose, a tail, and a hollow, elongate body extending therebetween, a wing extending laterally away from the fuselage, the wing including a leading edge in a direction of motion of the aircraft during normal flight and a trailing edge on an opposing edge of the wing, and an engine configured to drive a bladed rotatable member, the engine coupled to at least one of the wing and the fuselage. The aircraft further includes at least one of a forward chine member and an aft chine member extending from the fuselage at a point forward of the engine aftward to a point aft of the bladed rotatable member.

23 Claims, 13 Drawing Sheets

(51) Int. Cl.
   *B64D 27/00*    (2006.01)
   *B64C 11/00*    (2006.01)

(56) References Cited

U.S. PATENT DOCUMENTS

| | | | |
|---|---|---|---|
| 2,929,586 A | * | 3/1960 | Hurd, Jr. ................. B64C 11/00 |
| | | | 181/207 |
| 4,478,377 A | | 10/1984 | Fletcher et al. |
| 6,149,101 A | | 11/2000 | Tracy |
| 7,770,841 B2 | | 8/2010 | Butler et al. |
| 8,177,170 B2 | | 5/2012 | Fol et al. |
| 8,485,472 B2 | | 7/2013 | Suchy et al. |
| 8,678,314 B2 | | 3/2014 | Martino Gonzalez et al. |
| 2009/0045287 A1 | | 2/2009 | Belleville |
| 2009/0152400 A1 | | 6/2009 | Verde Preckler et al. |
| 2011/0062290 A1 | | 3/2011 | Chase et al. |
| 2014/0374566 A1 | | 12/2014 | Fernando et al. |

FOREIGN PATENT DOCUMENTS

| | | |
|---|---|---|
| EP | 2 610 164 A1 | 7/2013 |
| RU | 2 135 394 C1 | 8/1999 |
| WO | 2010/052446 A1 | 5/2010 |
| WO | 2010/124877 A1 | 11/2010 |

* cited by examiner

METHOD AND SYSTEM FOR OPEN ROTOR ENGINE FUSELAGE PROTECTION

BACKGROUND

This description relates to gas turbine engine powered aircraft, and, more particularly, to a method and system for fuselage protection and sound damping in an aircraft having an open rotor or turboprop engine.

At least some known aircraft are powered by gas turbine engines that include a nacelle surrounding a fan assembly configured to generate thrust for the aircraft. The nacelle extends from a position forward of the fan assembly axially aftward for some distance, typically aft of the fan assembly or core engine. The nacelle can be treated with acoustic panels to limit noise coming from the fan assembly, an impact armor system configured to retain fan blades liberated from the fan assembly during a flight event. However, other aircraft are powered by open rotor type gas turbine engines, such as, but, not limited to, turboprop engines. In such engines there is no nacelle to capture or deflect liberated blades or other debris ejected from the engine. The ejected debris then becomes an impact hazard for the aircraft.

BRIEF DESCRIPTION

In one embodiment, an aircraft includes a nose, a tail, and a hollow, elongate body extending therebetween. The aircraft also includes a wing extending laterally away from the fuselage, the wing including a leading edge in a direction of motion of the aircraft during normal flight and a trailing edge on an opposing edge of the wing. The aircraft further includes an engine configured to drive a bladed rotatable member, the engine coupled to at least one of the wing and the fuselage. The aircraft further includes a forward chine member extending from the fuselage at a point forward of the engine angularly aftward to a point aft of the bladed rotatable member and an aft chine member extending from the fuselage at a point aft of the engine angularly forward to a point aft of the bladed rotatable member.

In another embodiment, an aircraft includes a fuselage having a nose, a tail, and a hollow, elongate body extending therebetween, the aircraft further including a wing extending laterally away from the fuselage, the wing including a leading edge in a direction of motion of the aircraft during normal flight and a trailing edge on an opposing edge of the wing, the aircraft also including an engine configured to drive a bladed rotatable member, the engine coupled to at least one of the wing and the fuselage, a method of operating the aircraft includes forming a forward chine member extending from the fuselage at a point forward of the engine angularly aftward to a point aft of the bladed rotatable member.

In yet another embodiment, an aircraft powered by one or more gas turbine engines includes a fuselage including a nose, a tail, and a hollow, elongate body extending therebetween. The aircraft also includes a wing extending laterally away from the fuselage. The wing includes a leading edge in a direction of motion of the aircraft during normal flight and a trailing edge on an opposing edge of the wing. The aircraft further includes an engine configured to drive one or more fans to generate thrust, the engine coupled to at least one of the wing and the fuselage proximate the tail. A forward chine member extends from the fuselage at a point forward of the engine angularly aftward to a point aft of the bladed rotatable member.

BRIEF DESCRIPTION OF THE DRAWINGS

FIGS. 1-11 show example embodiments of the method and system described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to rotating machinery in industrial, commercial, and residential applications.

The following description refers to the accompanying drawings, in which, in the absence of a contrary representation, the same numbers in different drawings represent similar elements.

Figure 1:
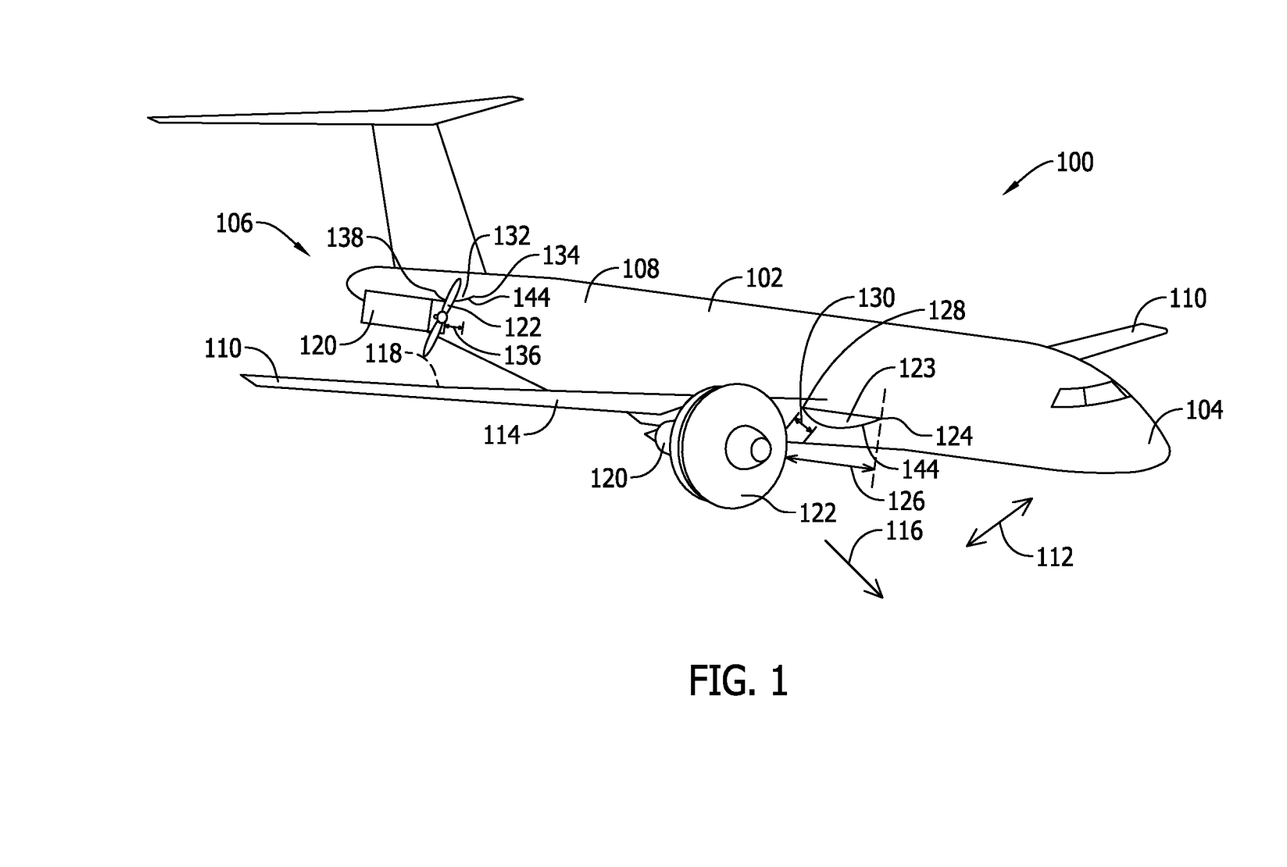
FIG. 1 is a perspective view of an aircraft.
Figure 2:
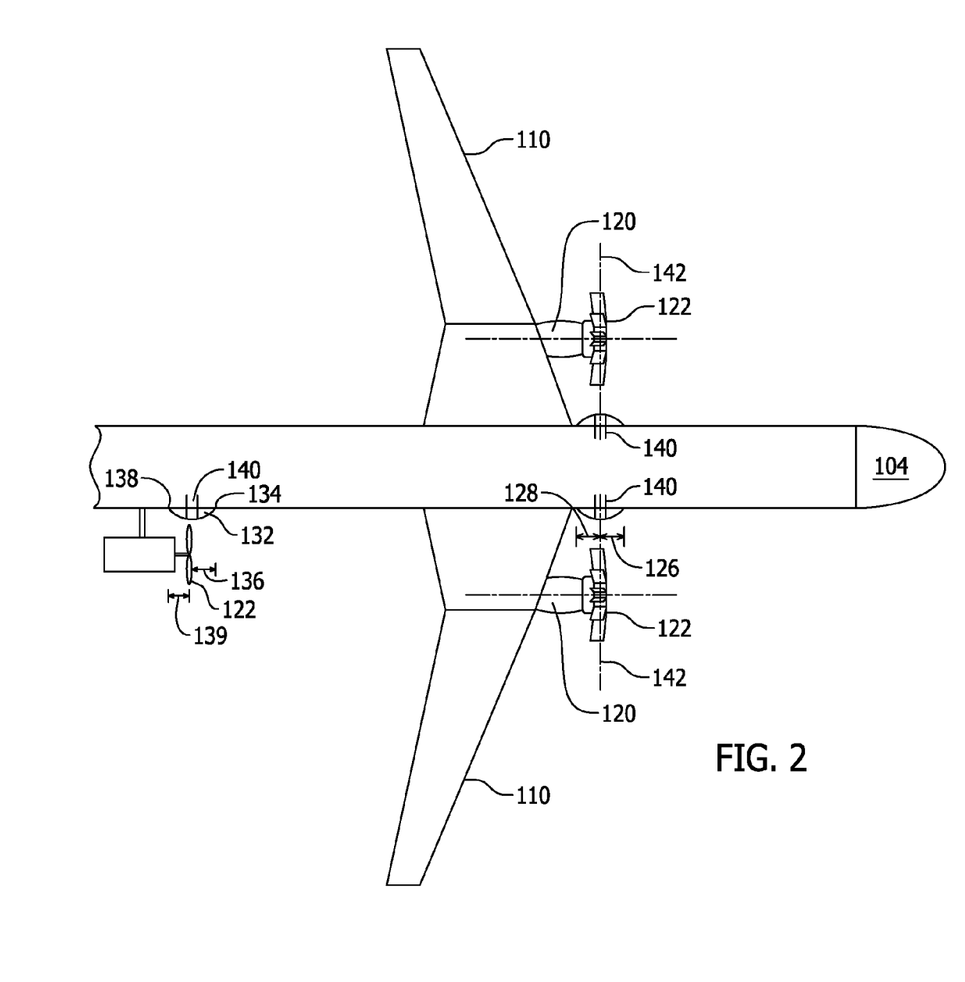
FIG. 2 is a plan view of the aircraft shown in FIG. 1.

FIG. 1 is a perspective view of an aircraft 100. FIG. 2 is a plan view of aircraft 100. In the example embodiment, aircraft 100 includes a fuselage 102 that includes a nose 104, a tail 106, and a hollow, elongate body 108 extending therebetween. Aircraft 100 also includes a wing 110 extending away from fuselage 102 in a lateral direction 112. Wing 110 includes a forward leading edge 114 in a direction 116 of motion of aircraft 100 during normal flight and an aft trailing edge 118 on an opposing edge of wing 110. Aircraft 100 further includes at least one engine 120 configured to drive a bladed rotatable member 122 or fan to generate thrust. Engine 120 is coupled to at least one of wing 110 and fuselage 102, for example, in a pusher configuration proximate tail 106. Although shown together on the same fuselage 102 in FIGS. 1 and 2, engine 120 in an under wing is generally not used with engines 120 in a pusher configuration. This configuration is shown for illustrative purposes. In various embodiments, a forward chine member 123 extends from fuselage 102 at a point 124 that is a predetermined distance 126 forward of engine 120. Forward chine member 123 extends aftward to a point 128 that is a second predetermined distance 130 aft of bladed rotatable member 122. An aft chine member 132 extends from fuselage 102 at a point 134 that is a predetermined distance 136 forward of aft engine 120. Aft chine member 132 extends aftward to a point 138 that is a predetermined distance 139 aft of aft bladed rotatable member 122. In some embodiments, engine 120 includes at least one of an open rotor configuration, a turboprop engine, a nacelle surrounding bladed rotatable member 122, and a multiple fan configuration.

In some embodiments, at least one of forward chine member 123 and aft chine member 132 includes an acoustic treatment within at least one chine member of the forward chine member 123 and aft chine member 132. At least one of fuselage 102, forward chine member 123, and aft chine member 132 includes an acoustic scattering feature configured to destructively interfere and partially cancel the acoustic waves incident from engine 120 on fuselage 102 as described in greater detail below.

In one embodiment, at least one of fuselage 102, forward chine member 123, and aft chine member 132 includes an impact armor system 140 configured to deflect and/or absorb debris ejected from engine 120. An angular position of forward chine member 123 and aft chine member 132 may be selected to provide a determined angle of incidence of particular debris most common to be ejected from engine 120 to facilitate deflection of the debris over or under fuselage 102. The selected angular position of forward chine member 123 and aft chine member 132 may also be determined based on an ability of the impact armor system to effectively absorb debris ejected from engine 120.

Figure 3:
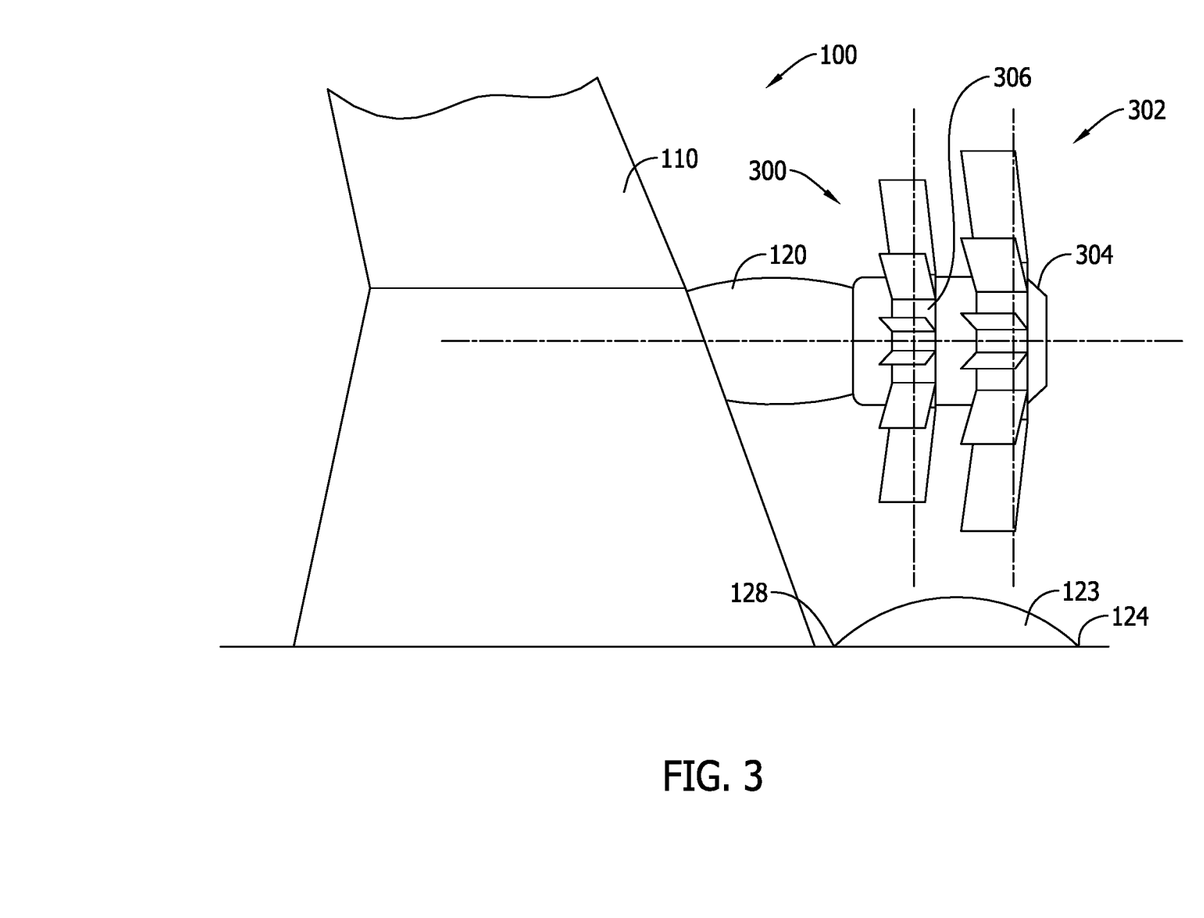
FIG. 3 is a plan view of a port side engine assembly of the aircraft shown in FIG. 1.

FIG. 3 is a plan view of a port side engine assembly 300 of aircraft 100 (shown in FIG. 1). It should be noted that a starboard side engine assembly (not shown) is similar to port side engine assembly 300. In the exemplary embodiment, engine assembly 300 includes a plurality of fan assemblies 302, for example, but not limited to, two fan assemblies, namely a forward fan assembly 304 and an aft fan assembly 306. In some embodiments, fan assemblies 302 are configured as contra-rotating with respect to each other. In other embodiments, fan assemblies 302 rotate in the same direction. In other embodiments, the aft fan assembly 306 may be stationary. In other embodiments, the aft blade row may be absent, as in a conventional turboprop.

Figure 4:
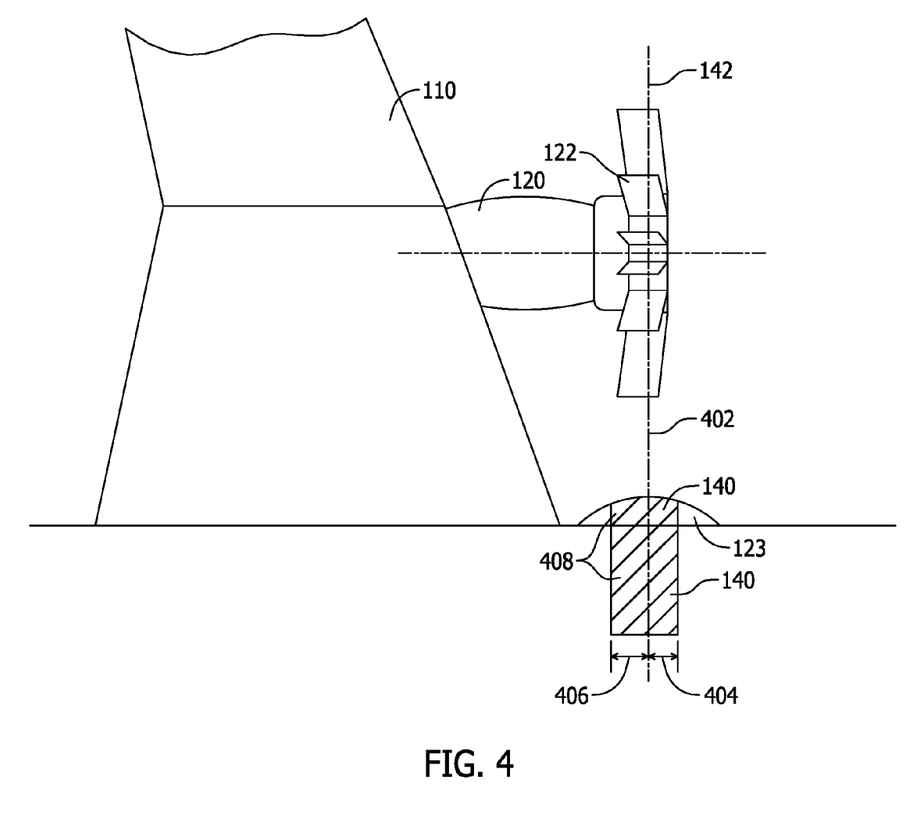
FIG. 4 is a plan view of port side engine assembly of the aircraft shown in FIG. 1.

FIG. 4 is a plan view of port side engine assembly 300 of aircraft 100 (shown in FIG. 1). In should be noted that a starboard side engine assembly (not shown) is similar to port side engine assembly 300. In the exemplary embodiment, impact armor system 140 is formed within forward chine member 123 and/or fuselage 102 at an axial position proximate an intersection 402 of plane 142 and forward chine member 123 and/or fuselage 102. Impact armor system 140 extends forward of intersection 402 a first predetermined distance 404 and extends aft of intersection 402 a second predetermined distance 406. Impact armor system 140 includes a plurality of layers of impact and penetration resistant material formed in a surface 408 of forward chine member 123 and/or fuselage 102. In other embodiments, a plurality of layers of impact and penetration resistant material are formed subsurface with respect to surface 408 of forward chine member 123 and/or fuselage 102. In still other embodiments, impact armor system 140 is formed of panels of impact and penetration resistant material. The panels of impact and penetration resistant material may include a combination of a plurality of layers of impact and penetration resistant material and an energy absorbing material.

Figure 5:
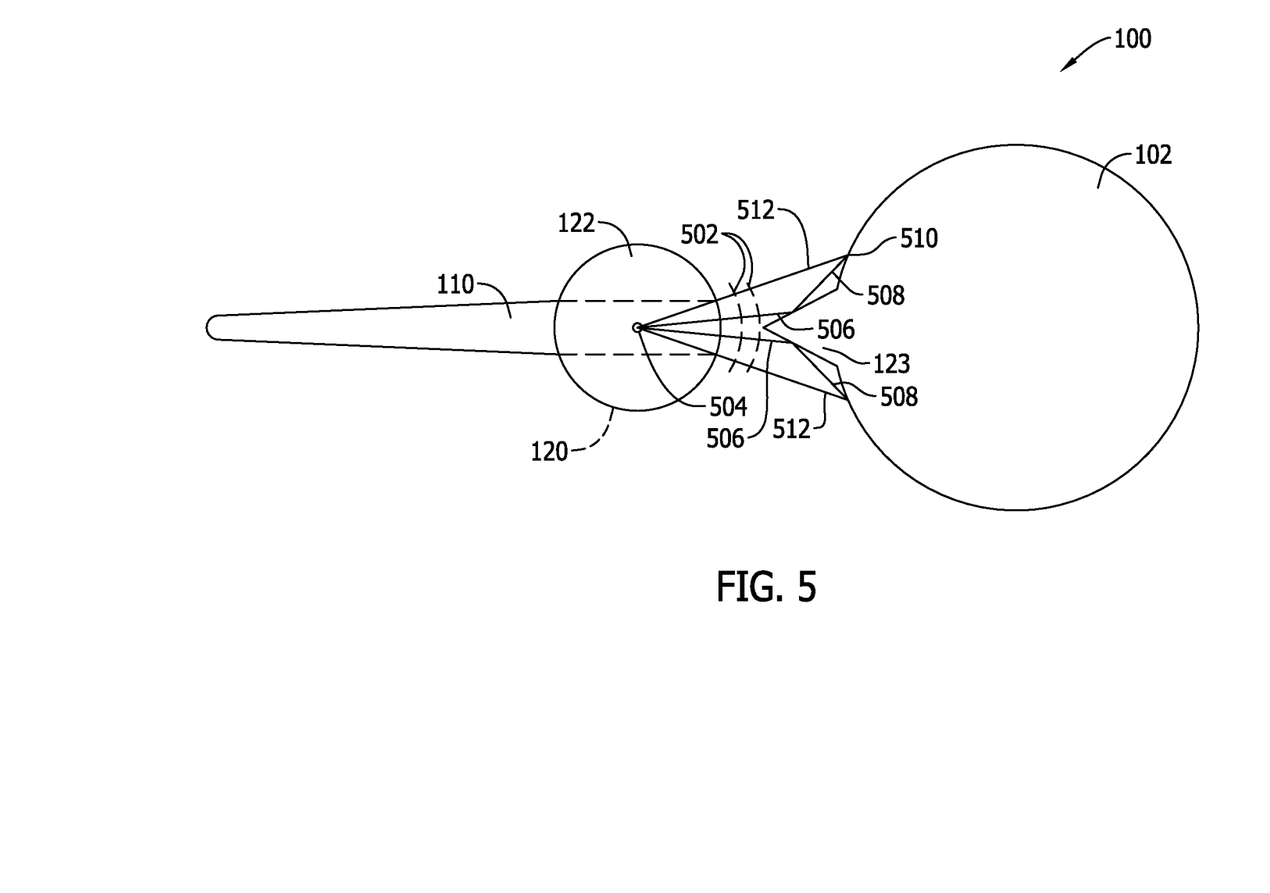
FIG. 5 is an axial view of the aircraft looking aft from a forward position in front of the aircraft.

FIG. 5 is an axial view of aircraft 100 looking aft from a forward position in front of aircraft 100. In the exemplary embodiment, wing 110 extends laterally away from fuselage 102 and includes a single engine 120 and a single fan assembly or other bladed rotatable member 122. As bladed rotatable member 122 rotates at various speeds, bladed rotatable member 122 generates noise 502 at a plurality of frequencies, some of which are of concern because of regulatory noise limitations, passenger comfort, public comfort, and structural considerations. The generated noise travels away from bladed rotatable member 122 in all directions to varying levels. The generated noise directed toward fuselage 102 is deflected by a contoured portion of forward chine member 123 away from fuselage 102, thereby reducing an amount of noise that has a least a possibility of entering fuselage 102.

In the exemplary embodiment, noise 502 travels in waves from a source 504, assumed to be a point source for explanation purposes. Although the waves of noise 502 are illustrated as being circular due to the assumption of their source being a point source, the waves of noise 502 are actually three-dimensional in shape due to the rotation of the noise sources as well as the propagation of shocks and pressure waves in non-uniform aerodynamic flows. Noise 502 travels from source 504 along, for example, a first path 506 to forward chine member 123 and then to fuselage 102 along path 508 to intersect fuselage 102 at a point 510. Noise 502 also travels along a path 512 directly to intersect fuselage 102 at point 510. For a known or calculable frequency of noise 502, dimensions of forward chine member 123 are selected such that paths 506 and 508 differ from path 512 in distance by approximately one half of a wave length of noise 502. Accordingly, waves intersecting point 510, and similarly, all other points not illustrated, are at least partially cancelled at point 510 and therefore to not contribute to noise in the cabin of fuselage 102. Ideally, complete cancelation of the waves is possible, however in practical application only a partial cancelation is expected. Even a partial cancellation of the waves contributes to a significant reduction of noise transmitted into fuselage 102. Although only two paths between source 504 and point 510 on fuselage 102 are illustrated, it should be understood that because noise 502 is a wave phenomenon, there are multitudinous points on fuselage 102 where such cancellation occurs. Even if the frequency of noise 502 changes such that the wave length of noise 502 is different, noise cancellation still occurs albeit to different levels and at different locations than point 510.

Figure 6:
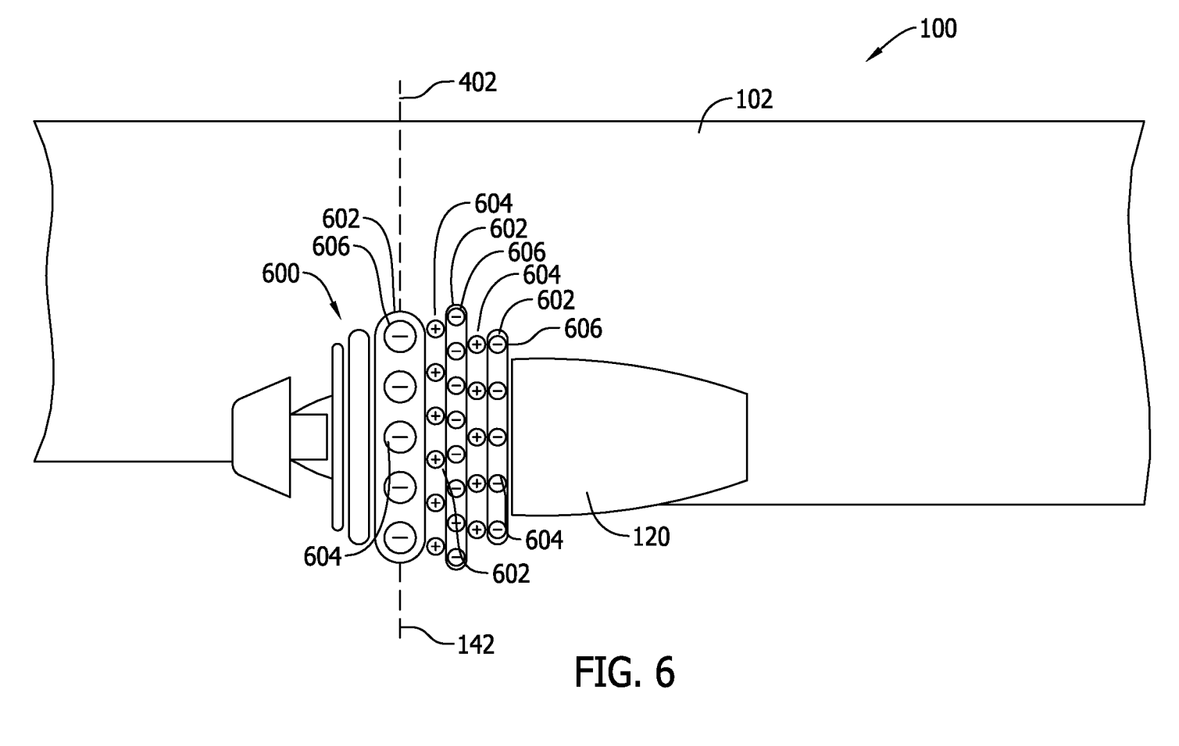
FIG. 6 is a side view of a portion of the fuselage proximate the intersection of the plane of rotation and the fuselage.

FIG. 6 is a side view of a portion of fuselage 102 proximate intersection 402 of plane 142 and fuselage 102. In the exemplary embodiment, a sound pressure level acoustic wave pattern 600 incident on fuselage 102 illustrates a plurality of alternating peaks 602 and troughs 604 of the incident acoustic wave pattern 600. An amplitude or sound pressure level of the sound waves incident on fuselage 102 can be seen to be highest proximate intersection 402 and of a lesser amplitude where the sound waves impact fuselage 102 further forward and aft from intersection 402. For example, the incident waves are loudest at the closest distance to the approaching blade tips as they rotate, and this region is typically extended vertically with intersection 402, decreasing slowly in the plane of rotation and decreasing more steeply in the upstream and downstream directions. The sound pressure level waves can be forced out-of-phase using surface features on a chine extending laterally outwardly from fuselage towards engine 120 in the area of intersection 402. Out-of-phase components 606 of sound pressure level acoustic wave pattern 600 are illustrated as circles overlaid on peaks 602 and troughs 604. The circles are labeled using a "plus" sign indicating an additive out-of-phase component 606 and using a "minus" sign indicating a subtractive out-of-phase component 606. Accordingly, when peak 602 interacts with a subtractive out-of-phase component 606 the sound pressure level associated with peak 602 tends to diminish and the sound transmitted into the skin of fuselage 102 is lessened. Similarly, when trough 604 interacts with an additive out-of-phase component 606 the sound pressure level associated with trough 604 tends to increase and the sound transmitted into the skin of fuselage 102 is lessened.

Figure 7:
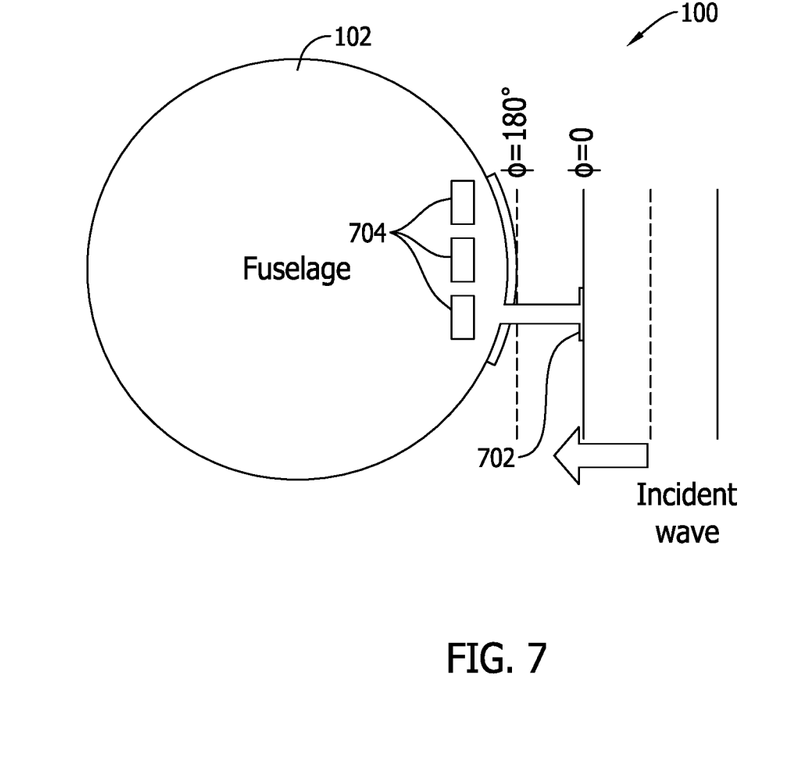
FIG. 7 is an axial view of the aircraft illustrating and effect of a transfer out-of-phase acoustic loading using an added shielding structure to cancel a reminder of incident acoustic power.

FIG. 7 is an axial view of aircraft 100 illustrating an effect of a transfer out-of-phase acoustic loading using added shielding structure 702 to cancel the acoustic power incident at fuselage 102. In the exemplary embodiment, a tip of forward chine member 123 is extended (remaining thin and aligned with the main airflow to minimize drag) to receive a portion of the incident acoustic energy at an earlier time than its arrival on fuselage 102. By designing the outward extending span length of forward chine member 123 accounting for the different vibrational sound speed in the structure as compared to acoustic sound speed in air, the energy at the exterior of the fuselage can achieve destructive interference with the adjacent acoustic energy directly incident on the adjacent surface of fuselage 102. In another embodiment, an active noise control 704 is used to further reduce incident noise on fuselage 102. For example, a Herschel-Quincke tube arrangement, rather than an additional acoustic source is used. In various embodiments, an array or a plurality of arrays of Herschel-Quincke tubes are used to further reduce the incident noise. Moreover, other interior treatment approaches are combined with forward chine member 123 and/or aft chine member 132 for effective interior noise abatement. Such treatments include passive and/or adaptive tuned vibration absorbers (TVAs) and active vibration control systems.

Figure 8A:
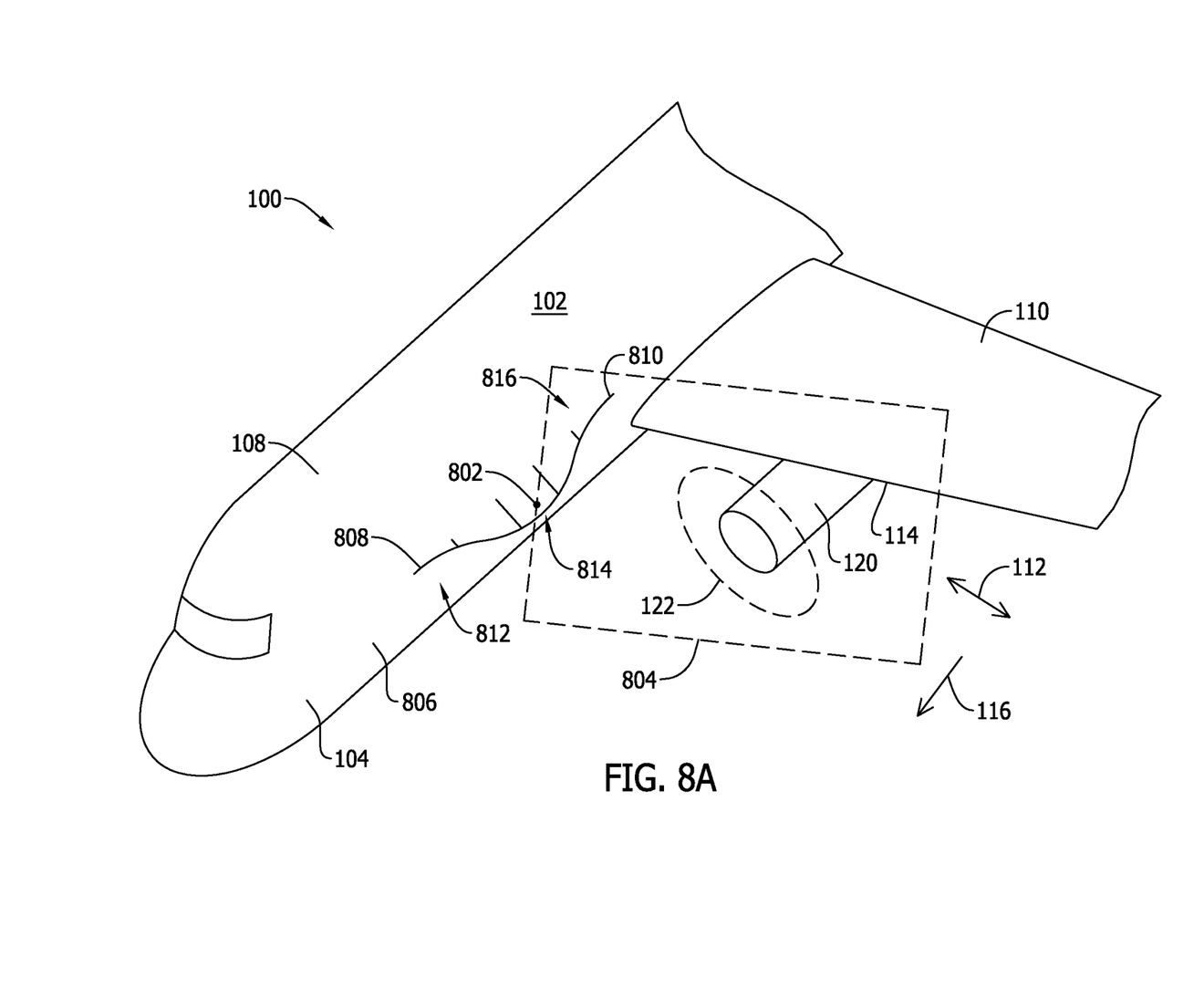
FIG. 8A is a perspective view of a portion of the aircraft shown in FIG. 1 in accordance with an example embodiment of the present disclosure.
Figure 8B:
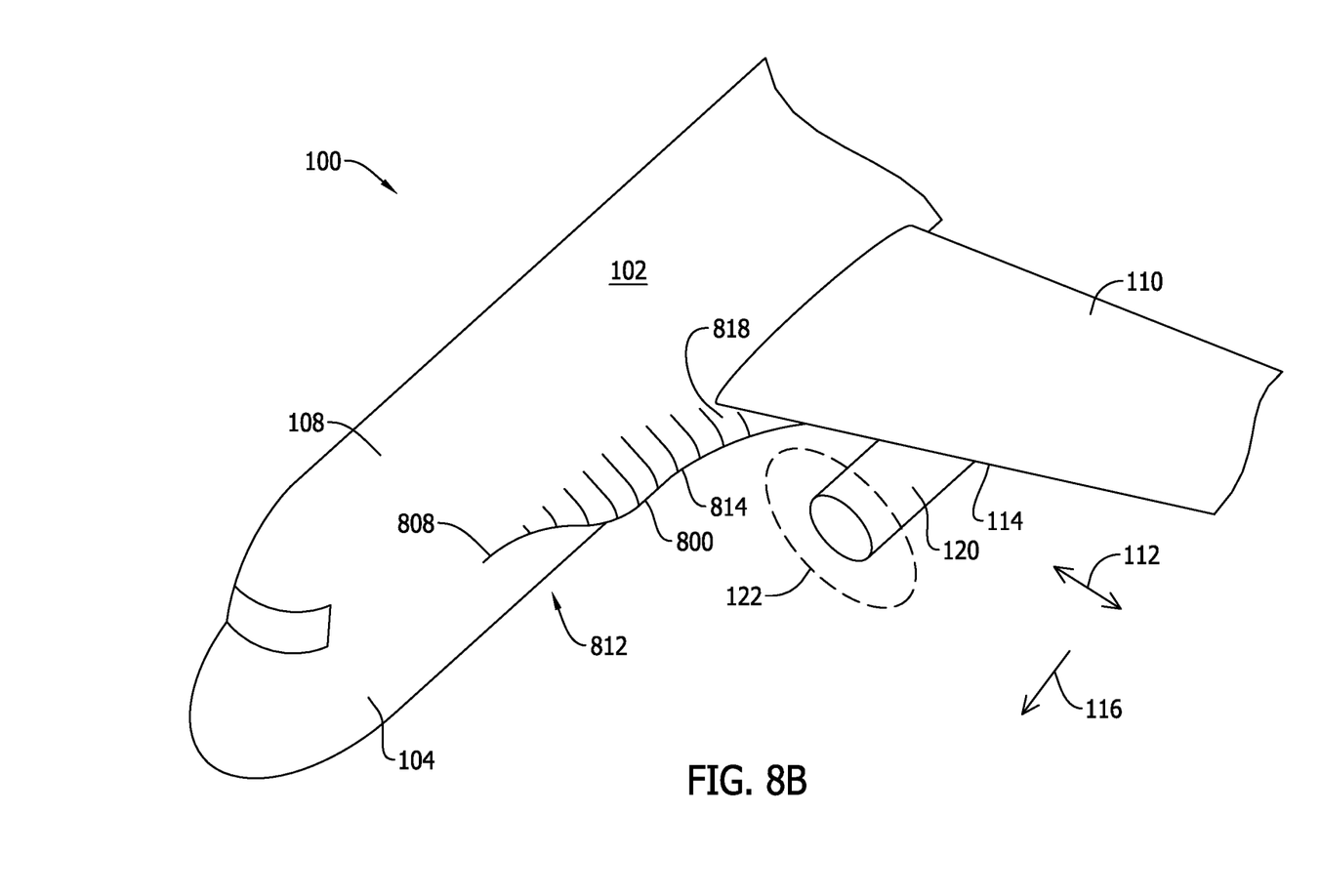
FIG. 8B is a perspective view of a portion of the aircraft shown in FIG. 1 in accordance with another example embodiment of the present disclosure.

FIG. 8A is a perspective view of a portion of aircraft 100 (shown in FIG. 1) in accordance with an example embodiment of the present disclosure. FIG. 8B is a perspective view of a portion of aircraft 100 (shown in FIG. 1) in accordance with an example embodiment of the present disclosure. In the example embodiments, aircraft 100 includes a fuselage 102. FIG. 8A illustrates a chine 800 that extends laterally outward from fuselage 102 at an approximate intersection 802 between fuselage 102 and a plane 804 of rotation of bladed rotatable member 122. Chine 800 extends along a lateral side 806 of fuselage 102 from a point 808 forward, relative to direction 116, of plane 804 to a point 810 aft, relative to direction 116, of plane 804. Point 810 is positioned forward of wing 110 such that chine 800 is a separate component from wing 110. In other embodiments, such as illustrated in FIG. 8B, chine 800 extends aftward past leading edge 114 of wing 110. In some embodiments, such as illustrated in FIG. 8A chine 800 only extends aftward to a point forward of leading edge 114.

Figure 10:
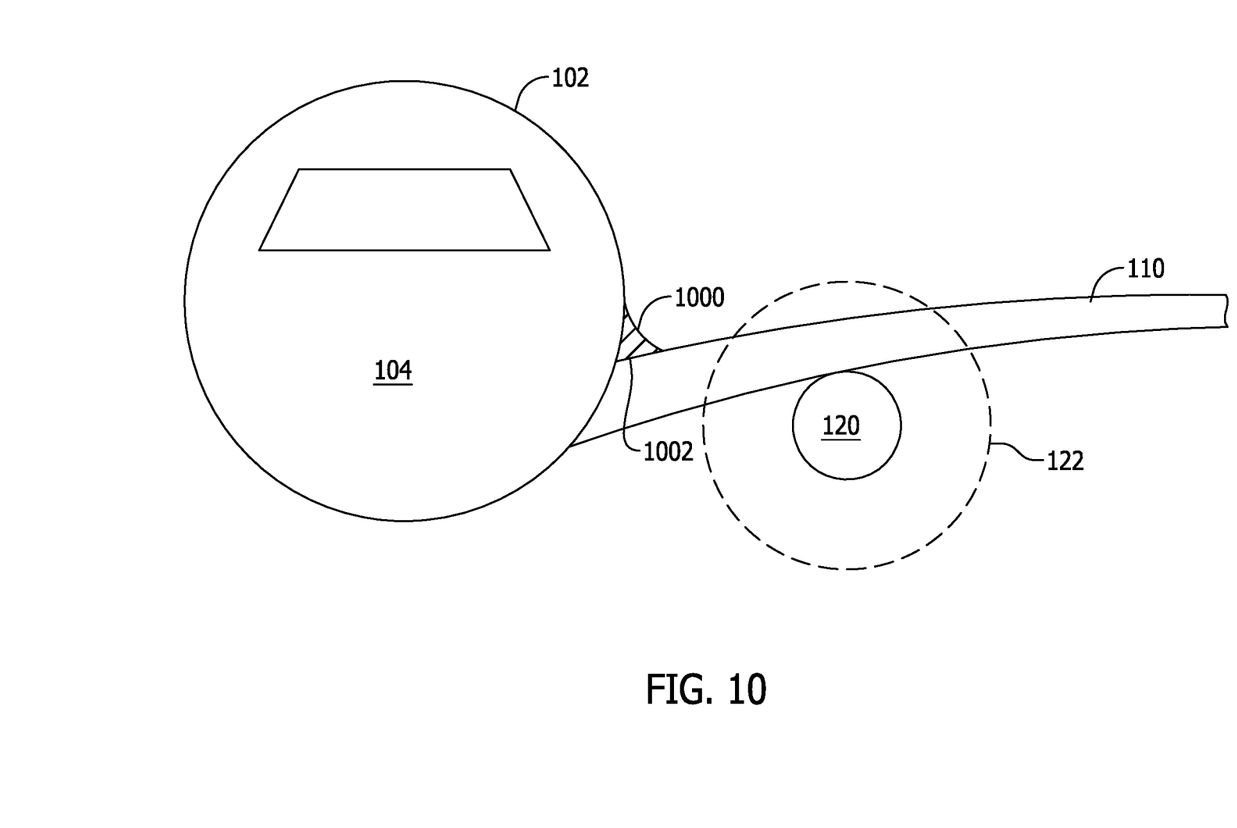
FIG. 10 is an axial view, looking aft of the aircraft shown in FIG. 1.

Chine 800 includes a forward end 812 that blends into fuselage 102 at point 808, a maximum width portion 814 proximate intersection 802, and an aft end 816 that blends into fuselage 102 at point 810. As shown in FIG. 10, chine 800 also blends into fuselage at an upper side 1000 of chine 800 and at a lower side 1002 of chine 800. In some embodiments, chine 800 also blends into wing 110 such that a smooth aerodynamic transition from chine 800 to fuselage 102 is presented at all contact points. In some embodiments, chine 800 may also be blended into the wing 110 at a contour area 818 to at least partially shield the fuselage 102 from impinging pressure waves from bladed rotatable member 122. As used herein, shielding is used to describe deflecting the pressure waves away from fuselage 102, interfering with the pressure waves and/or providing a mass between engine 120 and fuselage 102 that tends to damp the pressure waves.

Figure 9A:
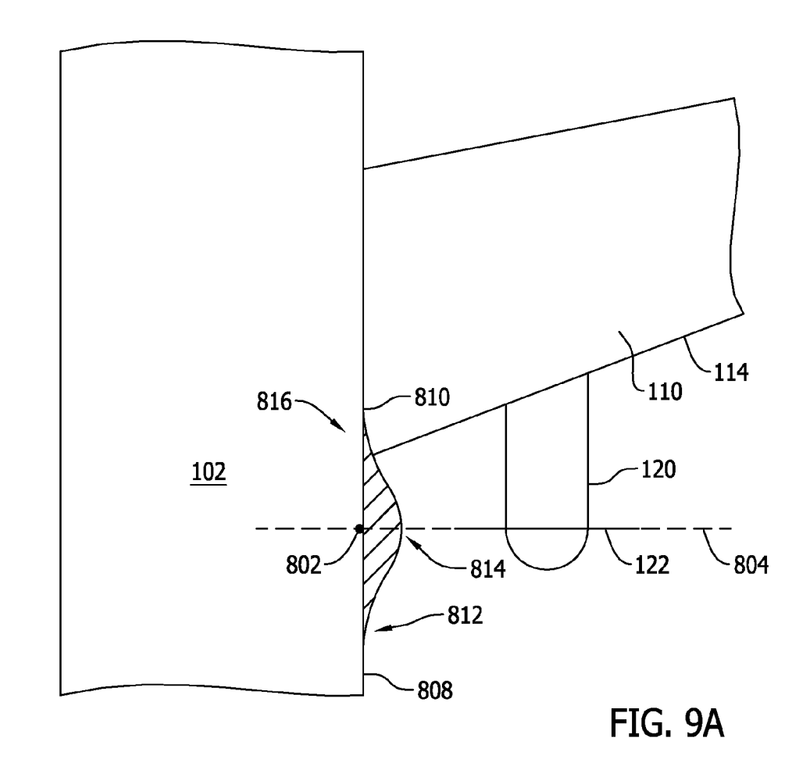
FIG. 9A is a plan view of a portion of the aircraft shown in FIG. 1.
Figure 9B:
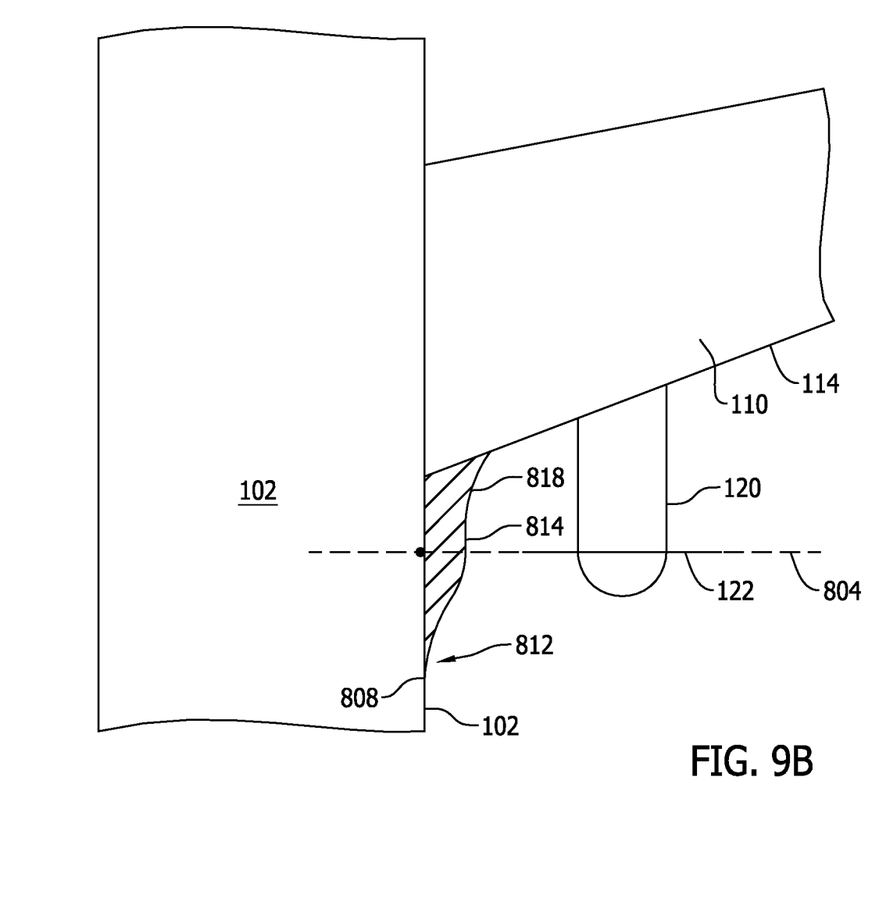
FIG. 9B is another plan view of a portion of the aircraft shown in FIG. 1.

FIG. 9A is a plan view of a portion of aircraft 100 illustrating a configuration of chine 800 shown in FIG. 8A. FIG. 9B is a plan view illustrating a configuration of chine 800 shown in FIG. 8B. In the example embodiment, aircraft 100 includes a fuselage 102. FIG. 9A illustrates chine 800 that extends laterally outward from fuselage 102 at an approximate intersection 802 between fuselage 102 and a plane 804 of rotation of bladed rotatable member 122. Chine 800 extends along a lateral side 806 of fuselage 102 from a point 808 forward, relative to direction 116, of plane 804 to a point 810 aft, relative to direction 116, of plane 804. Point 810 is positioned forward of wing 110 such that chine 800 is a separate component from wing 110. In other embodiments, such as illustrated in FIG. 9B, chine 800 extends aftward at least to leading edge 114 of wing 110. In some embodiments, such as illustrated in FIG. 9A chine 800 only extends aftward to a point forward of leading edge 114.

Chine 800 includes a forward end 812 that blends into fuselage 102 at point 808, a maximum width portion 814 proximate intersection 802, and an aft end 816 that blends into fuselage 102 at point 810. As shown in FIG. 10, chine 800 also blends into fuselage at an upper side 1000 of chine 800 and at a lower side 1002 of chine 800. In some embodiments, as shown in FIG. 9B, chine 800 also blends into wing 110, at contour area 818, such that a smooth aerodynamic transition from chine 800 to fuselage 102 is presented at all contact points. In some embodiments, chine 800 may also be blended into the wing 110 at a contour area 818 to at least partially shield the fuselage 102 from impinging pressure waves from bladed rotatable member 122. As used herein, shielding is used to describe deflecting the pressure waves away from fuselage 102, interfering with the pressure waves and/or providing a mass between engine 120 and fuselage 102 that tends to damp the pressure waves.

FIG. 10 is an axial view, looking aft of aircraft 100. In the example embodiment, aircraft 100 includes a fuselage 102. A chine 800 extends laterally outward from fuselage 102 at an approximate intersection 802 between fuselage 102 and a plane 804 of rotation of bladed rotatable member 122. Chine 800 extends along a lateral side 806 of fuselage 102 from a point 808 forward, relative to direction 116, of plane 804 to a point 810 aft, relative to direction 116, of plane 804. In other embodiments, chine 800 extends aftward past leading edge 114 of wing 110. In some embodiments, chine 800 only extends aftward to a point forward of leading edge 114.

Chine 800 includes a forward end 812 that blends into fuselage 102 at point 808, a maximum width portion 814 proximate intersection 802, and an aft end 816 that blends into fuselage 102 at point 810. As shown in FIG. 10, chine 800 also blends into fuselage at an upper side 1000 of chine 800 and at a lower side 1002 of chine 800. In some embodiments, chine 800 also blends into wing 110 such that a smooth aerodynamic transition from chine 800 to fuselage 102 is presented at all contact points. In some embodiments, chine 800 may also be blended into the wing 110 to at least partially shield the fuselage 102 from impinging pressure waves from bladed rotatable member 122. As used herein, shielding is used to describe deflecting the pressure waves away from fuselage 102, interfering with the pressure waves and/or providing a mass between engine 120 and fuselage 102 that tends to damp the pressure waves.

Figure 11:
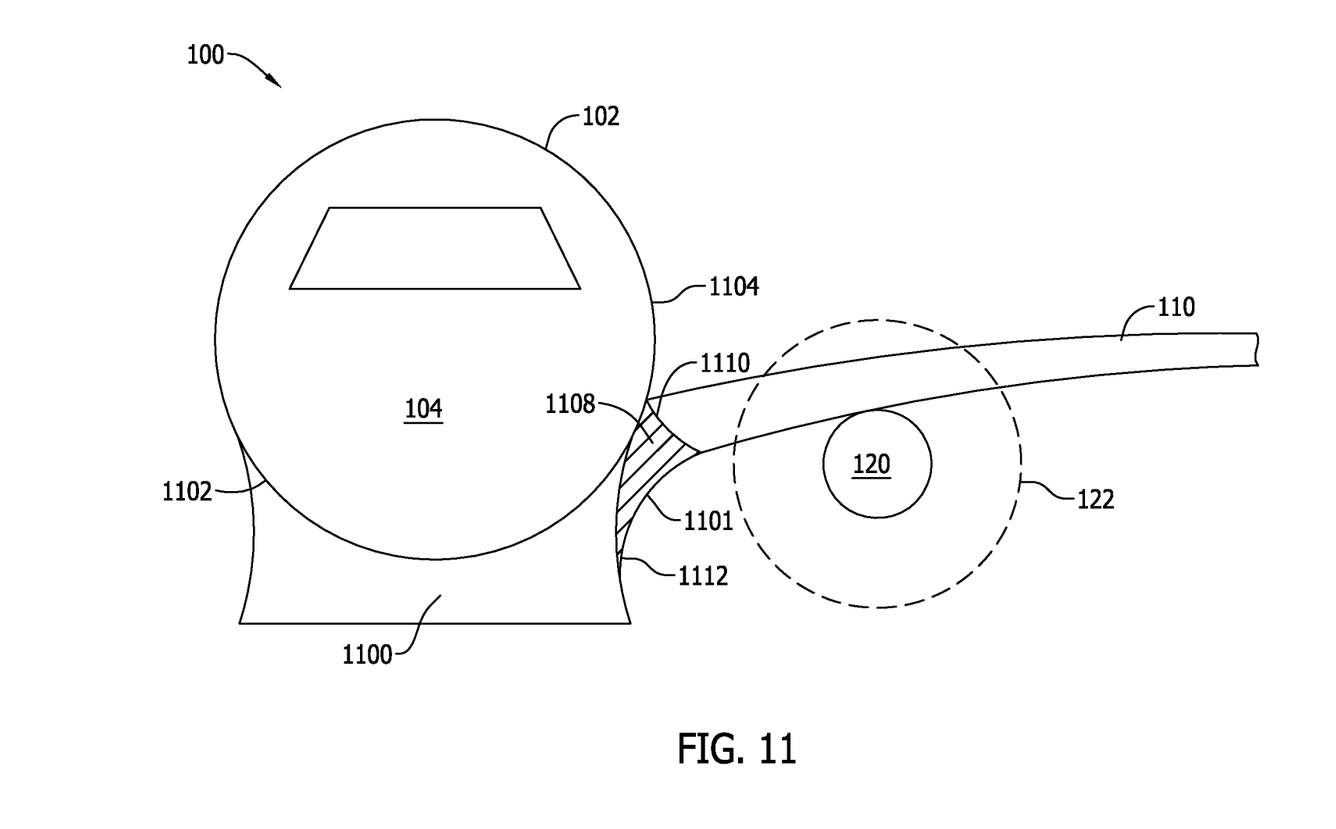
FIG. 11 is an axial view, looking aft of the aircraft shown in FIG. 1.

FIG. 11 is an axial view, looking aft of aircraft 100. In the example embodiment, aircraft 100 includes a fuselage 102 that includes a nose 104 and a wing 110 extending away from fuselage 102. Wing 110 includes at least one engine 120 configured to drive a bladed rotatable member 122 or fan to generate thrust. A "bathtub" fairing 1100 extends from a lower portion 1102 of fuselage 102. A chine 1101 extends laterally outward from fuselage 102 at an approximate intersection between fuselage 102 and a plane of rotation of bladed rotatable member 122. Chine 1101 extends along a lateral side 1106 of fuselage 102.

Chine 1101 includes a forward end 1108 having a contour that blends into fuselage 102 and chine 1101. As shown in FIG. 11, chine 1101 also blends into fuselage 102 at an upper side 1110 of chine 1101 and blends into fuselage 102 and/or bathtub fairing 1100 at a lower side 1112 of chine 1101. In some embodiments, chine 1101 also blends into wing 110 such that a smooth aerodynamic transition from chine 1101 to fuselage 102, wing 110, and bathtub fairing 1100 is presented at all contact points.

It will be appreciated that the above embodiments that have been described in particular detail are merely example or possible embodiments, and that there are many other combinations, additions, or alternatives that may be included.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The above-described embodiments of a method and system of operating an aircraft provides a cost-effective and reliable means for improving impact protection of the fuselage and noise abatement noise the fuselage. More specifically, the method and systems described herein facilitate armoring the fuselage against a liberated blade strike from an engine. In addition, the above-described method and systems facilitate providing noise cancellation and/or abatement using a chine that is laterally extending between the fuselage and the rotatable blades of the engine. In addition to providing mechanisms for passive noise cancellation, embodiments of the present disclosure provide for active noise cancellation and acoustic damping in combination. As a result, the method and system described herein facilitate improving aircraft operation in a cost-effective and reliable manner.

Example methods and systems for operating gas turbine engines are described above in detail. The apparatus illustrated is not limited to the specific embodiments described herein, but rather, components of each may be utilized independently and separately from other components described herein. Each system component can also be used in combination with other system components.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft comprising:
    a fuselage comprising a nose, a tail, and a hollow, elongate body extending therebetween;
    a wing extending laterally away from said fuselage, said wing comprising a leading edge in a direction of motion of said aircraft during normal flight and a trailing edge on an opposing edge of said wing;
    an engine configured to drive a bladed rotatable member, said engine coupled to at least one of said wing and said fuselage;
    at least one of a forward chine member and an aft chine member extending from said fuselage at a point forward of said bladed rotatable member aftward to a point aft of said bladed rotatable member.

2. The aircraft of claim 1, wherein said at least one of a forward chine member and an aft chine member is configured to shield the fuselage from impinging pressure waves from the engine.

3. The aircraft of claim 1, wherein said at least one of a forward chine member and an aft chine member comprises an acoustic treatment within said chine member.

4. The aircraft of claim 3, wherein said acoustic treatment within said chine member comprises at least one of a tuned vibration absorber (TVA) and a vibration control system.

5. The aircraft of claim 3, wherein said acoustic treatment within said chine member comprises at least one of a passive and an adaptive tuned vibration absorber (TVA).

6. The aircraft of claim 1, wherein said at least one of a forward chine member and an aft chine member comprises an impact armor system within said chine member.

7. The aircraft of claim 1, wherein said engine comprises at least one of an open rotor configuration a turboprop configuration, a nacelle surrounding said bladed rotatable member, and a multiple fan configuration.

8. The aircraft of claim 1, wherein said at least one of a forward chine member and an aft chine member comprises a physical feature configured to passively cause a wave front of an acoustic wave emitted in a first direction to intersect the wave front of the acoustic wave emitted in a second direction at the fuselage approximately 180° out-of-phase.

9. The aircraft of claim 8, wherein the acoustic wave emitted in the first direction travels a different distance to the fuselage than the acoustic wave emitted in a second direction.

10. The aircraft of claim 9, wherein the different distance is approximately equal to one-half of a wavelength or multiple thereof.

11. The aircraft of claim 8, wherein the acoustic wave emitted in the first direction travels at a different speed to the fuselage than the acoustic wave emitted in the second direction.

12. The aircraft of claim 11, wherein the acoustic wave emitted in the first direction travels in air to the fuselage and the acoustic wave emitted in the second direction travels through a portion of the aircraft to the fuselage.

13. The aircraft of claim 1, wherein said at least one of a forward chine member and an aft chine member comprises a blended surface contour between said wing and said fuselage proximate a plane of rotation of said bladed rotatable member.

14. A method of operating aircraft, the aircraft including a fuselage having a nose, a tail, and a hollow, elongate body extending therebetween, the aircraft further including a wing extending laterally away from the fuselage, the wing including a leading edge in a direction of motion of the aircraft during normal flight and a trailing edge on an opposing edge of the wing, the aircraft also including an engine configured to drive a bladed rotatable member, the engine coupled to at least one of the wing and the fuselage, said method comprising forming at least one of a forward chine member and an aft chine member extending from the fuselage at a point forward of the engine aftward to a point aft of the bladed rotatable member.

15. The method of claim 14, further comprising acoustically treating at least one of the forward chine member and the aft chine member internally to the at least one chine member.

16. The method of claim 14, further comprising coupling an impact armor system to at least one of the forward chine member and the aft chine member, the impact armor system including at least one of layers of impact and penetration resistant material and panels of a plurality of layers of impact and penetration resistant material and an energy absorbing material, the impact armor system formed at least one of in a surface of the forward chine member or fuselage and within an interior of the forward chine member or fuselage.

17. The method of claim 14, passively scattering at least one of an acoustic wave incident from the engine and an acoustic wave from the fuselage to approximately cancel the acoustic wave incident from the engine.

18. An aircraft powered by one or more gas turbine engines, said aircraft comprising:
a fuselage comprising a nose, a tail, and a hollow, elongate body extending therebetween;
a wing extending laterally away from said fuselage, said wing comprising a leading edge in a direction of motion of the aircraft during normal flight and a trailing edge on an opposing edge of said wing;
an engine configured to drive one or more fans to generate thrust, said engine coupled to at least one of said wing and said fuselage proximate said tail;
at least one of a forward chine member and an aft chine member extending from said fuselage at a point forward of said engine aftward to a point aft of said bladed rotatable member.

19. The aircraft of claim 18, wherein at least one of said forward chine member and said aft chine member comprises an acoustic treatment within said at least one chine member.

20. The aircraft of claim 18, wherein at least one of said forward chine member and said aft chine member comprises an impact armor system within said at least one chine member.

21. The aircraft of claim 18, wherein at least one of said fuselage and at least one of said forward chine member and said aft chine member comprises an acoustic scattering feature configured to passively generate an acoustic wave to approximately cancel an acoustic wave incident from said engine.

22. The aircraft of claim 18, wherein at least one of said fuselage and at least one of said forward chine member and said aft chine member comprises one or more interior acoustic treatments configured to generate an acoustic wave to approximately cancel an acoustic wave incident from said engine.

23. The aircraft of claim 18, wherein said at least one of said forward chine member and said aft chine member comprises a blended surface contour between said wing and said fuselage proximate a plane of rotation of said bladed rotatable member.

* * * * *